(No Model.)
A. KELL.
HAND TRUCK.
No. 350,001. Patented Sept. 28, 1886.
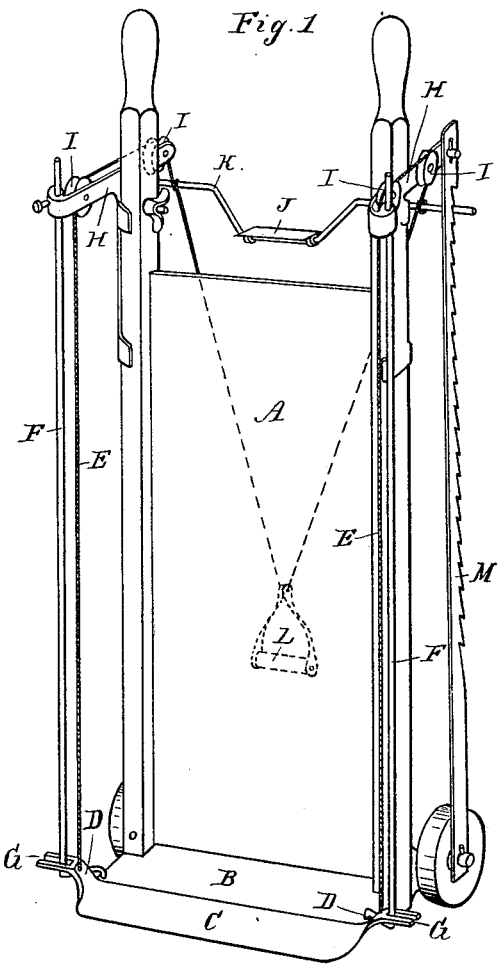
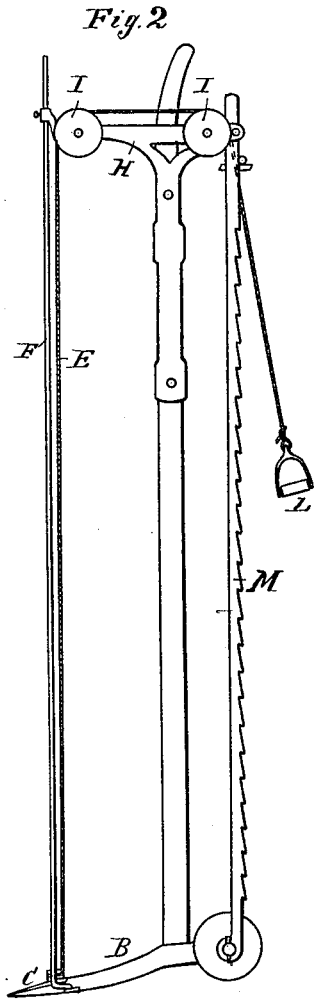
Attest:
John Schuman.
Edmond Scully.
Inventor:
Asa Kell.
by his Att'y
Thos. S. Sprague

UNITED STATES PATENT OFFICE.

ASA KELL, OF CONCORD, MICHIGAN.

HAND-TRUCK.

SPECIFICATION forming part of Letters Patent No. 350,001, dated September 28, 1886.

Application filed July 29, 1886. Serial No. 209,409. (No model.)

*To all whom it may concern:*

Be it known that I, ASA KELL, of Concord, in the county of Jackson and State of Michigan, have invented new and useful Improvements in Attachments to Hand-Trucks; and I do hereby declare that the following is a full, clear, and exact description thereof, reference being had to the accompanying drawings, which form a part of this specification.

This invention relates to certain new and useful improvements in hand-trucks; and the invention consists in the construction, arrangement, and combination with the truck, of devices for raising the load on the truck from the ground to a higher level as required for loading cars or wagons or for piling merchandise.

In the drawings which accompany this specification, Figure 1 is a perspective view of my improved truck. Fig. 2 is a side view thereof.

A is a hand-truck of the ordinary two-wheeled kind, and provided with a scoop, B.

C is a movable shoe of suitable shape and form to fit the top of the scoop.

D D are ears formed on the shoe. E E are elevating-ropes secured to said ears.

F F are two parallel guide-bars.

G G are guides formed on the shoe and engaging with the guide-bars F.

H H are brackets secured to the frame of the truck.

I are grooved pulleys carried by the brackets H.

J is a stirrup formed on the rigid bar K, which is near its ends secured to the elevating-ropes. L is another stirrup flexibly connected to the elevating-ropes, and M M are bars (one of which does not appear in the drawings) provided with notches into which the ends of the stirrup-bar K are adapted to engage.

In practice, the parts being arranged as shown and described, if it is desired to raise a piece of merchandise—such as a bag of flour, for instance—to a higher level so as to load it more easily on the platform of a wagon, the operator brings his truck into the vertical position, as shown in the drawings, whereby the bag is supported on the shoe C. Then by placing one foot into the stirrup L and applying his weight the operator carries the stirrup down, while at the same time the shoe C with the load is raised up a like distance. By repeating the same maneuver with the other stirrup, J, which is now about in the former position of the stirrup L, the load is raised still farther. The operator, by causing the bar K, which carries the upper stirrup, to engage into the notched bar M, can arrest the load at the desired height and then push the bag off the shoe onto the platform of the wagon. The shoe C is made sufficiently heavier than the stirrups to cause the shoe to drop down to its original position on the scoop B as soon as the bar K is released from its engagement with the notched bars M.

I preferably secure all the parts comprising my lifting device detachably to the truck so that they may be readily taken off when not required. To this end the brackets H are detachably secured to the sills of the frame in any suitable manner, the lower ends of the guide-bars F are detachably secured to the scoop, and the lower ends of the notched bars M are detachably secured on the axle of the wheels. The upper ends of the guide-bars F and of the notched bars M are preferably detachably secured to the brackets H.

My device, which enables one man to do work usually requiring two, will be found especially useful for loading bags filled with grain, flour, or other similar merchandise the weight of which is generally inferior to the weight of an ordinary man, and it will save a good deal of time and labor.

What I claim as my invention is—

1. In an elevating-truck, a movable shoe fitting the scoop of the truck, in combination with elevating-ropes attached thereto and passing over pulleys on the opposite end of the truck, substantially as described.

2. In an elevating-truck, a movable shoe fitting the scoop of the truck and combined with elevating-ropes attached thereto and passing over pulleys to the back of the truck and terminating in stirrups, substantially as described.

3. In an elevating-truck, the combination of the shoe C, having guides G, guide-bars F, elevating-ropes E, pulleys I, stirrups J L, and notched bars M, all arranged to operate substantially as described.

4. In an elevating-truck, the combination of the shoe C, having slotted guides G, guide-bars F, elevating-ropes E, brackets H, pulleys I, notched bars M, stirrup L, stirrup J, and bar K, all arranged to operate substantially as described.

5. In combination with a truck having a scoop, an elevating attachment consisting of the movable shoe C, fitting the scoop and having guides G, the elevating-ropes E, secured thereto, the brackets H, detachably secured to the sills of the frame, the guide-bars F, detachably secured at one end to the brackets H and at the other to the scoop, the pulleys I, carried by the brackets H, the stirrup J, rigidly connected to the elevating-ropes, the flexibly-connected stirrup L, and the notched bars M, detachably secured at the lower ends to the axle of the wheels and at the upper end to the brackets H, all substantially as described.

ASA KELL.

Witnesses:
H. S. SPRAGUE,
E. SCULLY.